(No Model.)
J. W. JOHNSON.
TIRE TIGHTENER.
No. 541,440. Patented June 18, 1895.
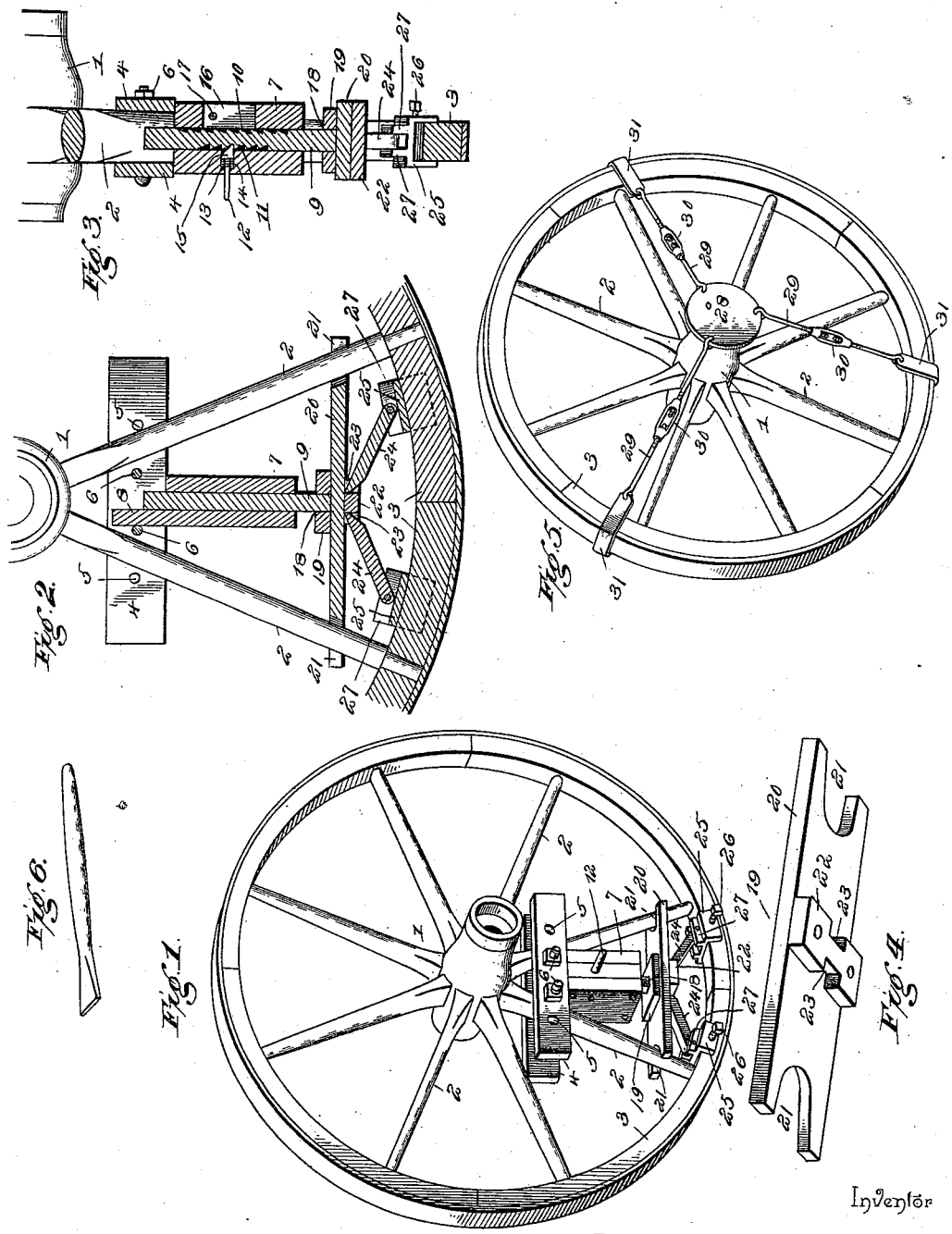
Witnesses
Inventor
John W. Johnson,
By his Attorneys.

UNITED STATES PATENT OFFICE.

JOHN W. JOHNSON, OF LEIGHTON, ALABAMA.

TIRE-TIGHTENER.

SPECIFICATION forming part of Letters Patent No. 541,440, dated June 18, 1895.

Application filed December 15, 1894. Serial No. 531,949. (No model.)

*To all whom it may concern:*

Be it known that I, JOHN W. JOHNSON, a citizen of the United States, residing at Leighton, in the county of Colbert and State of Alabama, have invented a new and useful Tire-Tightener, of which the following is a specification.

The invention relates to an improvement in that class of tire tighteners wherein a ratchet bar or its equivalent is provided and associated with means for connecting it with one or more spokes and with the tire of the wheel, whereby upon the operation of the ratchet bar, the spokes may be forced inwardly and the tire outwardly, so as to securely fix the former in the hub, and so as to engage the tire, to the end that washers may be applied to the outer end of the spokes.

The object of the present invention is to make a device which will be capable of more effective operation, and whereby the tire may be tightened by the application of less power and without the necessity for skilled service.

To this end, the invention consists in a casing or sleeve in which a ratchet bar is arranged, and which carries a pawl, by which the ratchet bar is held at the proper adjustment. The casing which carries the ratchet bar is provided with means whereby it may be rigidly connected to one or more spokes, while the ratchet bar is connected to a peculiarly constructed plate, which in turn is provided with means whereby it may be connected to a pair of pawls or links for connection with the tire.
These pawls or links and their associated parts have peculiar features of construction in which novelty resides, and which will be fully described hereinafter. Further, the casing or sleeve which carries the ratchet bar has a peculiar construction by which I am enabled to more effectually operate the ratchet bar, and to hold it in proper position when so operated.

It is also an object of my invention to provide means for imparting to the wheel the usual dish, and to make this operation capable of easy performance. To this end, the invention further consists in a plate adapted to be temporarily secured to the outer end of the hub, and having connected thereto radially extending rods, the outer ends of which are provided with clips, whereby they may be connected to the tire of the wheel. The radial extending rods are divided into two sections and connected with turn-buckles, whereby they may be drawn, and the force thereof applied to the tire so as to give it the desired dish.

In the drawings, Figure 1 represents a perspective view of a wheel to which my improved tire-tightener is shown as applied. Fig. 2 is a vertical section taken through the tire-tightener and extending to parts of the wheel immediately adjacent thereto. Fig. 3 is a detailed section taken through the casing or sleeve for the ratchet-bar and on a line at right angles to the line of Fig. 2. Fig. 4 is a detailed perspective of the plate to which the ratchet-bar is connected at its lower end and which serves to effect a connection with the pawls or links of the tire, the view being taken toward the under side of the plate. Fig. 5 is a perspective view of a wheel, showing it applied to the device for dishing the same. Fig. 6 is a perspective view of a lever which is used in the operation of my device.

The reference numeral 1 indicates the hub of the wheel, 2 the spokes, and 3 the tire, all of which may be of any preferred construction.

4 indicates two duplicate plates which are each provided with transverse perforations 5, through which bolts 6 pass. These bolts pass through the plates 4, and by their means, the said plates are clamped against the spokes of the wheel, they being arranged, one on each side of the spokes, and being of a length which may make them capable of embracing two spokes. The plates 4 are arranged at the inner ends of the spokes to which they are applied.

7 indicates the casing or sleeve within which the ratchet bar, referred to hereinbefore, passes, and this casing or sleeve may be constructed of wood or metal, as preferred, and may be formed integral or of a number of separate pieces formed together. This latter mode is that shown in the drawings, and it is there shown to consist of two side pieces having end pieces arranged between their edges, the whole being bolted together by bolts passing through the several parts.

Rigidly secured to or formed integral with the casing 7 is the arm 8, which is provided to be received between the plates 4, and to hold the casing 7 securely in connection therewith.

9 indicates the ratchet bar, which is approximately square in cross sections, and which has the ratchet teeth 10 and 11 thereon. The ratchet teeth 10 are arranged on one side and the teeth 11 on the other. The teeth 11 are adapted to co-operate with a pawl 12, which operates in a passage 13 formed in the casing or sleeve, and which has its inner portion embraced by an expansive spring 14, whereby the head 15 of the pawl is given a tendency inward, and may be continually engaged with the side of the ratchet bar 9, which has the pawls 11 thereon. These ratchet teeth 11 are so disposed that when engaged by the pawl 12, they will effectually prevent all inward movement of the ratchet bar, the said bar being free to move outwardly by reason of the formation of the ratchet teeth and the beveled head of the pawl.

Formed in that side of the sleeve or casing 7, which is opposite the side having the pawl 12, is the longitudinal elongated opening 16, which is provided to permit access to the teeth 10 of the ratchet bar. This access is necessary in order that the pawls 10 may be engaged, and the ratchet bar moved outwardly.

17 indicates a pin which extends transversely through the inner end of the opening 16, and which is provided to form a fulcrum for the lever shown in Fig. 6 of the drawings. This lever is merely a rod or bar with a pointed nose and of a width capable of allowing it to be introduced into the opening 16, whereupon it may be engaged with the teeth 10, and by swinging it on the pin 17 the bar 9 may be moved outwardly; and during this operation the pawl 12 will snap over the teeth 11, as has been explained. It will be observed, however, that the pawl 12 will operate to hold the bar at any position in which it may be placed by reason of this operation of the lever in Fig. 6, and to permit the disconnection of the pawl with the bar 9, when it may be desired to retract the bar, the outer end of the pawl is extended beyond the casing 7, so as to form means by which the pawl may be grasped and moved outwardly.

The length of the bar 9 is such that its ends will be respectively extended toward the corresponding ends of the casing 7; and the outward end of the bar 9 is adapted to be seated within the opening 18 of the block 19. This block 19 is rigidly secured to the inner or upper side of the plate 20, and it is by these means that the bar 9 is connected to said plates. The plate 20 is of a width greater than the width of the plates 4, and has its ends provided with notches 21, which are respectively adapted to receive the adjacent spokes 2, and whereby the plate 20 is steadied in its seat and made capable of radial movement in a line with the spokes under the influence of the bar 9. The outer or under side of the plate 20 is provided with a block 22, which is rigidly secured in place, and which has its sides formed with notches 23 arranged on opposite sides thereof, and provided for the reception of the free and inner ends of the links or pawls 24, such devices being two in number and arranged one within each notch.

25 indicates two U-shaped clips or blocks, which are of a size that will enable them to embrace the inner side of the tire 3, and which are provided with set screws 26, whereby they may be clamped against the felly and held rigidly in place. Formed integral with and rigidly secured to the inner sides of the clips 25 are the lugs 27, which are two for each clip, and each pair of which has passed through it a pin, which also passes through the inner end of the respective links or pawls 24, said inner ends being arranged between the lugs 27. By these means the links are pivotally connected to the respective clips, and the clips are in turn connected to the felly of the wheel, as has been explained. When it is desired to use this portion of my invention as a tire tightener, the plates 4 are rigidly bolted to two of the spokes. The casing 7 should now be arranged with its arm 8 between the plates 4, and with the casing between the spokes embraced by said plates. The clips 25 should now be secured in place upon the tire and between the two spokes aforesaid, so that the pawls 24 may fit within the respective notches of the block 22. The bar 9 having been previously fitted within the opening 18 of the block 20, all that will be necessary to expand the device is to introduce the lever of Fig. 6 into the opening 16, and to engage it with the ratchet teeth 10, so as to move the bar 9 outwardly step by step. This forces the plate 20 outwardly also, and causes the movements thereof to be transmitted to the pawls 24 and clips 25. This operation will result in pushing the spokes to which the plates 4 are attached inwardly seating them securely within their opening of the hub 1. It will also result in a forcing of the tire outwardly, thus permitting tightening washers to be inserted between the outward ends of the spokes and the tires, and also permit the joints in the felly to be tightened by placing packing between the contiguous ends thereof.

The device is released from the wheel by drawing the pawl 12 outwardly, which will permit the bar 9 to move inwardly, and thereby disengage it from the plate 20. This will permit the casing 7 to be removed whereupon the other parts may be taken off, as will be understood.

The device for effecting the dish of the wheel consists of a plate 28, preferably circular in form, though this may be varied to any desired extent. This plate is connected to the hub 1 by means of a tack or nail driven through it or into the hub. This tack or nail need not be of any great strength since there will be no tendency of the plate 10 to be disconnected from the hub, owing to the equal distribution of the strain on said plate. Connected to the plate 28 at points equally distant throughout its periphery are the rods 29, which are preferably three in number, and which proceed radially to the tire of the wheel where they are provided with the clips 31. These clips are one for each rod 29, and are made to embrace the tire of the wheel, and may be secured in place by a short nail or tack, if so desired. The necessity for this will not be very urgent, however, since the strain on the rods 29 will tend to hold them in place. Each of the rods 29 is divided into two parts, and these parts are connected to each other by means of the turn-buckles 30, said turn-buckles being one for each rod 29, and being capable of operation to tighten the rods. This movement of the rods 29 being applied to the tire laterally will tend to draw them in that direction, and will give them that dish, which is the object of this portion of my invention to provide. When the wheel has been subjected to the influence of this part of my invention to a sufficient degree, the device may be removed and placed aside, it being understood that it is adapted merely for temporary attachment during its operation. The same may, of course, be said regarding the tire tightener explained above.

Having thus described the invention, what I claim, and desire to obtain by Letters Patent, is—

1. In a tire tightener, a pair of clamping plates having bolts by means of which they may be clamped upon opposite sides of and against two of the spokes of a wheel, in combination with a casing comprising an oppositely disposed pair of plates extending transversely of and abutting against the edges of the clamping plates for a support, an extension on one of said casing plates projecting between the clamping plates for regulating the relative positions of the casing and the clamping plates, an opening in one side of the casing, a fulcrum pin crossing said opening, a ratchet bar movable within the casing and having reversely disposed series of ratchet teeth on opposite sides thereof, a spring pressed pawl operating within the casing and in engagement with one set of ratchet teeth, a lever for engaging the other ratchet teeth through said opening in the casing, and the spreading pawls and clips interposed between the outer end of said ratchet bar and the felly, substantially as specified and for the purpose set forth.

2. In a tire tightener the combination of a pair of plates provided with bolts, whereby they may be rigidly secured, one on either side of the two spokes, a casing provided with an arm capable of fitting between the plates, whereby it is held in position, a ratchet bar movable within the casing, a pawl operating to hold the ratchet bar in place, a plate 20 having notches at its ends, whereby it may be slidably connected to the spokes aforesaid, and between the same, said plate 20 having at its upper side a block formed with an opening therein, in which opening the outer end of the ratchet bar is received, the opposite side of the plate 20 having a second block which is notched at opposite sides, two clips capable of embracing the tire and provided with set screws by which they may be held in place, each of said clips having a pair of lugs rigidly secured to their inner sides, and a pawl or link pivoted between each pair of lugs, and extending toward the notched block of the plate 20, within which notches the free ends of the pawls or links are received, substantially as described.

In testimony that I claim the foregoing as my own I have hereto affixed my signature in the presence of two witnesses.

JOHN W. JOHNSON.

Witnesses:
F. R. KING,
F. W. McCORMACK.